April 23, 1957 C. E. WEBB 2,789,334
CLAY PIPE CUTTING MECHANISM
Filed Aug. 18, 1953 4 Sheets-Sheet 1
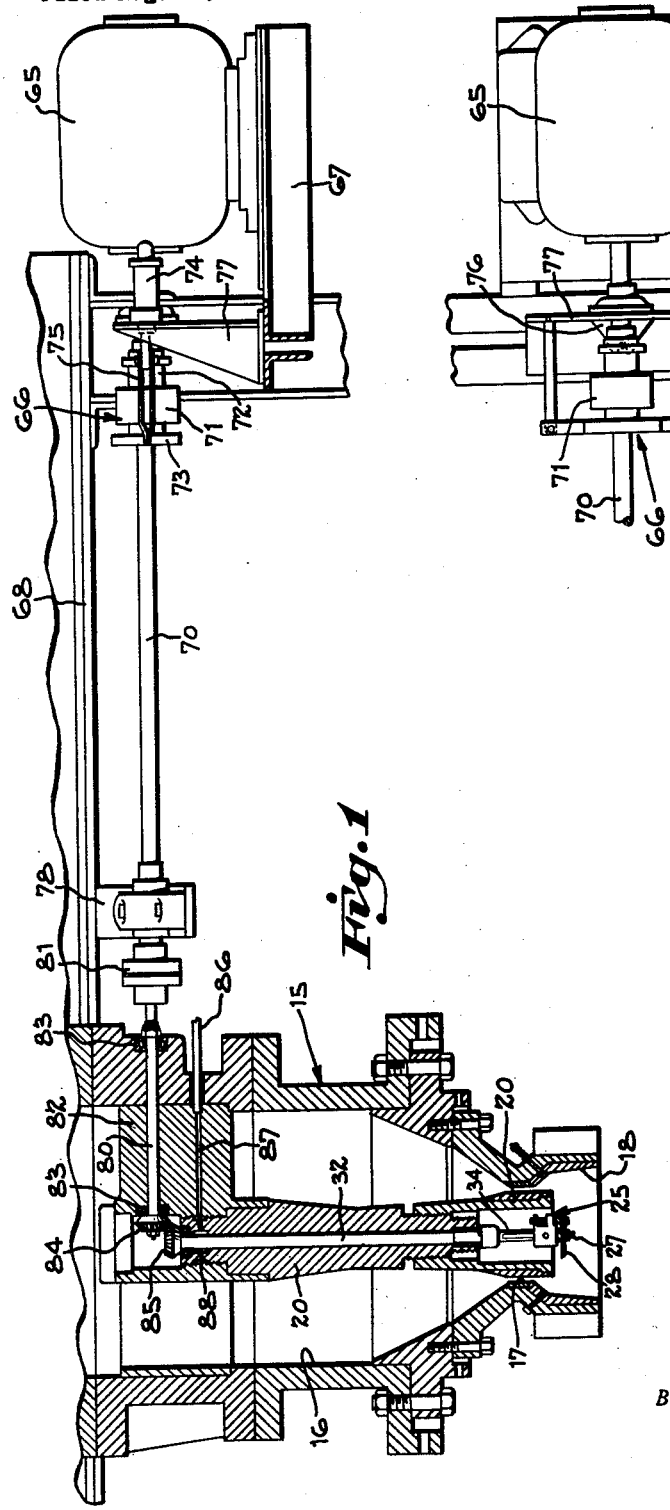
INVENTOR.
Cecil E. Webb
BY Wood, Herron & Evans
Attorneys

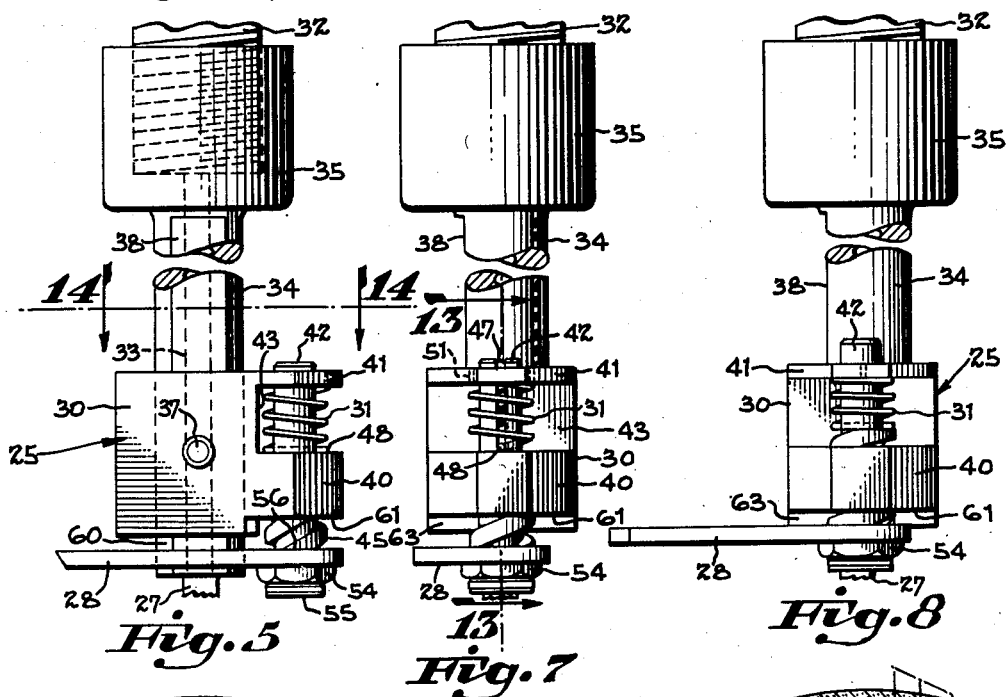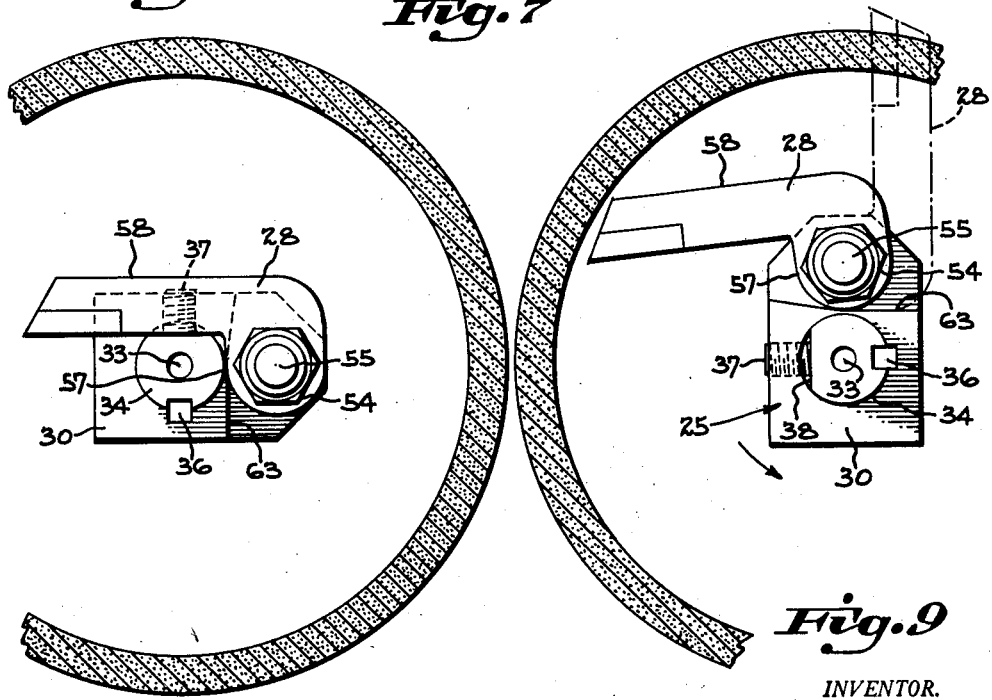

April 23, 1957  C. E. WEBB  2,789,334
CLAY PIPE CUTTING MECHANISM
Filed Aug. 18, 1953  4 Sheets-Sheet 4

INVENTOR.
Cecil E. Webb
BY
Wood, Herron & Evans
Attorneys

United States Patent Office 2,789,334
Patented Apr. 23, 1957

2,789,334

CLAY PIPE CUTTING MECHANISM

Cecil E. Webb, Cincinnati, Ohio, assignor to M. S. Bowne, Clearfield, Ky., trustee Application August 18, 1953, Serial No. 374,889

6 Claims. (Cl. 25—39)

This invention relates to the extrusion of clay sewer pipes and the like and is directed particularly to improvements in a rotary cutting mechanism for severing the extruded pipes at a plane within the extrusion die after each extrusion cycle.

A cutoff mechanism of this character is disclosed in the copending application of Cecil E. Webb for "Clay Pipe Cutting and Die Lubricating Apparatus," Serial No. 359,480 now Patent No. 2,693,016, which was filed on June 4, 1953. The cutting mechanism of the copending application and present application is disclosed in relation to an automatic apparatus for controlling the operating cycles of a steam operated extrusion press of the type disclosed in another copending application of Cecil E. Webb entitled "Pipe Extrusion Apparatus," Serial No. 276,118, now Patent No. 2,754,562, which was filed on March 12, 1952.

According to the last mentioned application, sewer pipes having a socket at one end are produced at a rapid production rate under automatic control by first molding the socket in a former die which includes an internal core die or mandrel, with a former cap movable axially with respect to the die and arranged to seat within it. At the start of the operation, the cap is locked to the die and plastic clay is extruded under pressure into the die cavity to form the socket. Thereafter, the cap is unlocked and the spigot or cylindrical portion of the pipe is extruded from the die at a rapid rate, forcing the cap downwardly until the required spigot length is obtained. At this point the cutoff mechanism is energized in response to the downward motion of the cap to sever the pipe, the severed length of pipe is removed, and the cap returns to the die where it is again locked for the next cycle of operation.

Complete seating and locking of the cap in the die, at least in certain machines, is one of the critical factors of rapid cyclic operation, since the cap must move substantially into contact with the end of the mandrel before it can be locked to the die. It is highly important therefore that the extruded pipe be severed as closely as possible to the end of the mandrel. In other words, if a ring of clay is left extending beyond the end of the mandrel, it will prevent the lock from functioning automatically and will thus interrupt the cyclic operation until the obstruction is cleared by hand.

The present structure has been developed expressly to trim the pipe as closely as possible to the end of the mandrel so as to insure proper functioning of former lock, particularly that type which is not capable of compressing or displacing residual clay in the former die. For this purpose, the cutting mechanism is provided with a cutting head mounted for rotation within the pipe and having a blade which extends itself outwardly and also climbs upwardly toward the end of the mandrel when the head is rotated so as to sever the pipe flush with the end of the mandrel, leaving no residual clay to impede the cap when it returns to the die. After severing the pipe, the blade retracts and concurrently descends to its former plane beneath the end of the mandrel.

In this respect, the present structure follows the copending application; however, in order to provide the climbing action in the prior structure, the cutting blade is mounted upon a shaft which is movable axially, allowing the blade to climb or spiral upwardly by the planing effect of its chamfered cutting edge acting upon the wall of the clay pipe. In the prior structure, the climbing motion is utilized for two purposes; first to allow the blade to move axially in the event that clay is still issuing from the die when the knife extends itself, secondly to allow the blade to move upwardly to cut the clay flush with the mandrel and thereafter to move downwardly out of contact with the severed clay so that the blade can retract freely.

One of the primary objects of the present invention has been to provide a blade mounting arrangement which has a positive spiral climbing and descending motion as the blade swings to extended and retracted positions so as to make certain that the pipe is cut flush with the end of the mandrel under all conditions. The climbing motion of the blade also allows the blade to move bodily out of contact with the severed clay so as to swing freely upon being retracted. In the present structure, the blade does not float axially in the event that clay is issuing from the die; however it has been determined that the speed of rotation of the blade, in conjunction with the planing effect of its cutting edge, compensates for any downward motion of the clay column during the severing operation.

In order to provide the spiral blade motion, a blade shaft is provided which includes course screw threads, the threaded shaft being rotatably engaged in a threaded bore formed in the mounting head to provide a positive camming action. The threads are pitched in a direction to cause the shaft and its blade to climb upwardly as the blade swings to extended position and to descend as the blade swings to retracted position. Accordingly, the blade moves upwardly in a fixed spiral path to sever the pipe flush with the mandrel and moves reversely in the same path downwardly out of contact with the severed end in order to retract freely. In addition, a combined compression and torsion spring engages the knife shaft and tends to rotate it toward retracted position and also urges it downwardly. The spring therefore stores energy as the blade is extended so as to supplement the inertia force in retracting it and also urges the retracted blade constantly in retracting direction to prevent accidental outward displacement.

Another object of the invention has been to provide a structure in which the mounting head is of one-piece construction, capable of being fabricated by simple machining operations; also to provide a structure which is not apt to become clogged or jammed by plastic clay particles or cuttings which are dislodged during the cutting operations.

Other features and advantages of the invention will be more clearly apparent to those skilled in the art from the following description taken in conjunction with the drawings.

In the drawings:

Figure 1 is a fragmentary side view partially in section, illustrating the general arrangement of the cutting mechanism and its driving system in relation to the extrusion die of a steam press.

Figure 2 is a fragmentary top plan view projected from Figure 1, illustrating the motor and clutch-brake mechanism which controls the periodic rotation and braking of the cutting mechanism to extend and retract the blade.

Figure 5 is an enlarged fragmentary side elevation of the assembled cutting mechanism with the cutting blade in retracted position.

Figure 6 is a bottom plan view projected from Figure 5, showing the relationship of the cutting head to the extruded clay pipe.

Figure 7 is an end view of the cutting mechanism as projected from Figure 5.

Figure 8 is an end view similar to Figure 7, showing the blade in its partially extended position.

Figure 9 is a bottom plan view projected from Figure 8 showing the relationship of the partially extended blade to the clay pipe and showing the blade in broken lines in its fully extended position.

General arrangement

The present cutoff mechanism is intended primarily for use with a steam operated extrusion press, either under manual or automatic control, as disclosed in the above noted copending applications. The cutter head is rotatably mounted within the former die and in retracted condition, resides within the clay pipe as the pipe is extruded. The blade, which is pivotally mounted on the rotary head, is extended to cutting position by inertia and centrifugal force upon the sudden application of rotary movement to the head, and in swinging outwardly, the blade pierces the wall of the pipe, rotates about the central axis of the pipe and severs it. The cutter head is rotated and stopped abruptly in time with the cyclic operation of the press by a driving system powered by an electric motor and controlled automatically in response to the reciprocations of the former cap as explained later. When the pipe is severed, the head is brought to an abrupt stop, causing the blade to pivot by inertia to a retracted position. In this position it is adapted to nest within an opening formed in the former cap when the cap returns to the die at the end of its cycle of reciprocation.

Figure 3:
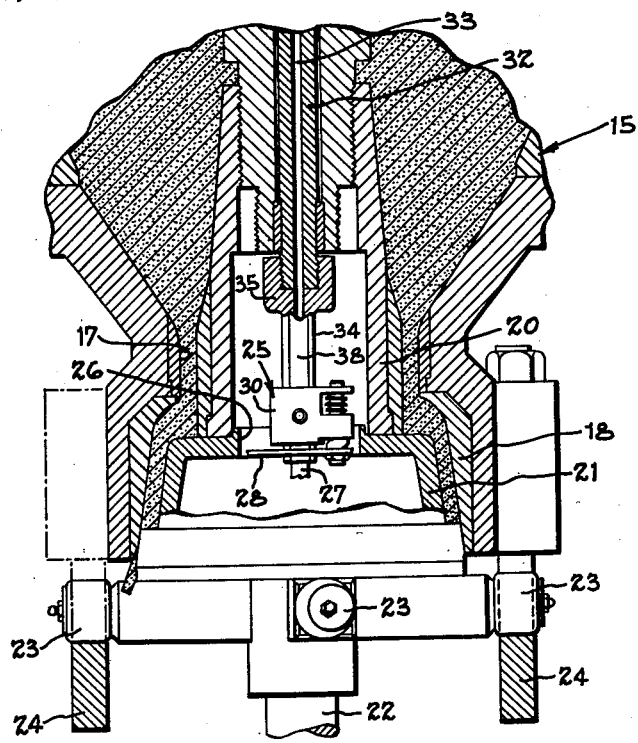
Figure 3 is an enlarged sectional view taken from Figure 1 with the former cap locked to the die and the socket of the pipe extruded into the die cavity at the beginning of an extrusion cycle.

Under automatic control, the cycle starts with the former cap locked to the die and with the cutting head nested in the cap as shown in Figure 3 of the drawings. In this position, the cap and die form a cavity in which the socket is molded when the press lever is shifted to extruding position; thereafter, the press lever is shifted by the operator to relief position and the automatic apparatus responds by unlocking the former cap for movement away from the die.

Figure 4:
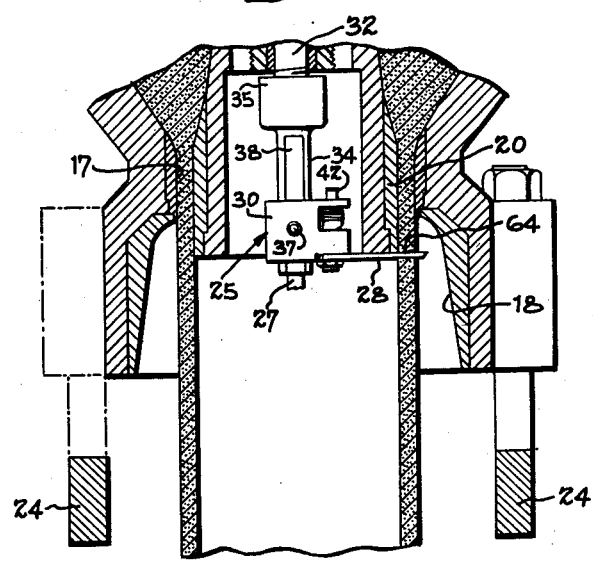
Figure 4 is a view similar to Figure 3, showing the spigot portion of the clay pipe extruded, with the cap propelled away from the die and the blade in extended position at the start of the cutting operation.

When the cap is unlocked, the operator again shifts the lever to extruding position, causing the spigot or column portion of the pipe to be extruded as shown in Figure 4, and propelling the cap away from the die. When the required spigot length is obtained, the press lever is shifted to the relief position to stop the extrusion.

By virtue of the rapid extrusion of the clay column, the former cap continues its downward motion under momentum, leaving the pipe suspended momentarily from the die. As the former cap structure reaches its downward limit of motion, it trips a cutoff switch which controls the cutoff driving mechanism, causing the cutting head to be rotated suddenly to extend the cutoff blade and sever the pipe.

In order to allow the former cap to seat fully within the die without being impeded by residual clay, the cutoff mechanism resides within the die upon its central axis and severs the clay flush with the end of the core die or mandrel which is located within the former die. Accordingly, there is no interference when the former cap reenters the die and engages the lower end of the mandrel. In order to cut the pipe at the end of the mandrel without striking it, the blade is arranged to spiral upwardly from a lower plane and to move into contact with the mandrel after the blade extends itself, as explained in detail later.

As soon as the cutting operation is completed, the cutoff mechanism is braked abruptly to a stop, causing the blade to swing to its retracted position by inertia and concurrently to spiral downwardly to its starting plane below the end of the mandrel in position so as to nest within the cap when the cap returns. Upon entering the die, a cap locking switch is tripped automatically, locking the cap to the die to condition the machine for the next cycle of operation.

As explained earlier, the present application relates particularly to improvements in the cutoff mechanism; therefore, a complete disclosure of the steam press and associated parts is not necessary to a complete understanding of the structure. The general arrangement of the cutoff mechanism and its driving system is disclosed in Figure 1 in conjunction with the die assembly which forms a part of the extrusion press. The extrusion die is indicated generally at 15 and includes a cylindrical bore 16 in communication with the extrusion chamber of the press (not shown). The lower portion of the die includes a restricted throat 17 communicating with the former die 18 in which the socket is molded.

The die assembly includes an internal core die or mandrel 20 extending axially through the bore 16 and through the restricted throat, with its lower end projected into the former die 18. The mandrel thus delineates the inside diameter of the pipe while the restricted throat 17 delineates the outside diameter. The inside diameter of the socket is determined by the former cap 21 as shown in Figure 3, while the outside socket diameter is delineated by the internal surface of the former die 18.

The sectional construction of the extrusion die and associated parts is such that various sizes of dies may be installed to suit various pipe diameters. It will be understood that former caps 21 and former dies 18 for the various sizes are installed to provide pipe sockets matching the several pipe diameters. Upon reference to Figure 3, it will be noted that the former cap 21 is mounted for vertical movement upon a table rod 22 and is locked in closed position by rollers 23 which engage the hooks 24 attached to the former die. The present cutoff mechanism is intended to include a lubricating nozzle suitable to spray lubricant upon the cap and die to prevent the plastic clay from adhering to the die surfaces as disclosed in the prior application.

Cutoff mechanism

Referring to Figure 3, it will be noted that the cutoff mechanism, indicated generally at 25, is rotatably mounted upon the central axis of the former die so as to reside within the clay pipe as it is extruded. In the position shown, the cutoff mechanism is in stationary position with its blade retracted and nested within an opening 26 formed in the top of the former cap. The lubricating nozzle, which is not shown, is mounted upon a tube 27 and also resides within the hollow former cap when the cap is locked to the die.

As explained earlier the various pipe diameters are produced by installing upon the extrusion die interchangeable former dies and caps of the required diameters; therefore, upon making such change, it is necessary to change the cutoff mechanism correspondingly. If the change is a minor one, for example, one or two inches in diameter, a replacement cutting blade 28 can be installed on the cutter head. On the other hand if the change is a major one, the entire cutoff mechanism may be removed and replaced with one having components of proportionate size.

The former cap reciprocates rapidly with respect to the die as the successive clay pipes are extruded, severed and removed from the machine. It is essential therefore that the blade be swung to retracted position and held in this position as the cap returns to the die. In other words, if the blade failed to retract, or retracted only partially, it would extend into the path of the cap and would be broken or damaged when the cap enters the die.

Referring to Figures 6 and 9, it will be noted that the cutting blade is shifted from retracted to extended position upon rotation of the cutting head 30 in the direction indicated by the arrow, the speed of rotation being sufficient to swing the blade outwardly by inertia and centrifugal force. The blade swings through an arc of approximately 180° and during its swinging motion, it climbs from the plane below the end of the mandrel as shown in Figure 3 and moves into contact with the end of the mandrel as shown in Figure 4. The spiral motion is imparted by a climbing screw arrangement as described in detail later which cams the blade upwardly in a positive manner.

The pivotal motion also winds up a torsion spring 31 which biases the blade downwardly and also arcuately in retracting direction. The spring stores the energy generated by the blade as it is extended and utilizes the stored energy to aid in swinging the blade in back to its retracted position when the cutoff mechanism is braked suddenly to a stop. The spring is preloaded in retracting direction so as to apply a constant retracting force on the blade to urge it constantly in retracted position after the mechanism is braked.

The spring, by its bias effect, also holds the blade in retracted position until the cutoff head comes up to full speed before extending itself suddenly through the wall of the pipe. For this purpose the blade resides near the axis of rotation when in retracted position as shown in Figure 6, causing the blade to snap suddenly to open position when the head comes up to full speed. This is found to provide a cleaner line of severance since the end of the blade pierces the wall at one point instead of dragging around the wall progressively more deeply. After completing several revolutions, the cutoff mechanism is braked to a stop abruptly, causing the blade to swing by inertia from its extended to its retracted position.

Referring to Figure 1, the cutoff mechanism is mounted upon the lower end of a vertical drive shaft 32 extending axially through the mandrel 20 and in driving connection with the motor as explained later in detail. Shaft 32 includes a lubricant bore 33 as shown in Figure 3 for supplying lubricant to the tube 27 of the lubricant nozzle, the bore being in communication with a supply of compressed air and lubricant (not shown).

As detailed in Figure 5, the cutoff mechanism is mounted upon the lower end of a spindle 34 which includes at its upper end a threaded hub 35 connected by screw threads with the lower end of shaft 32. The head or knife mounting block 30 is mounted upon the lower portion of spindle 34 and is adjustable vertically upon the spindle in order to locate the blade flush with the lower end of the mandrel. Block 30 is non-rotatably connected to the spindle by means of the key 36 (Figure 6) and is locked in adjusted position by a set screw 37 passing through the block with its inner end engaged against a flat 38 formed on the outside diameter of the spindle.

Block 30 is generally square and includes at one end a pair of laterally projecting lugs 40 and 41 forming an integral part of the block and rotatably journalling the blade shaft 42. The blade shaft is located outwardly from the axis of spindle 34 and extends parallel with it. As best shown in Figure 5, the lateral lugs 40 and 41 are delineated by a slot 43 which is machined transversely across the end of the block from one side to the other.

Figure 13:
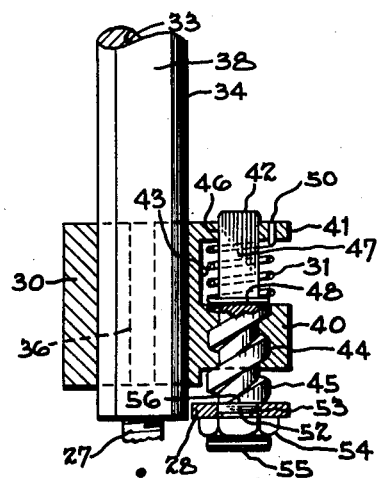
Figure 13 is a sectional view taken on line 13—13, Figure 7, detailing the structure of the blade mounting shaft.
Figure 14:
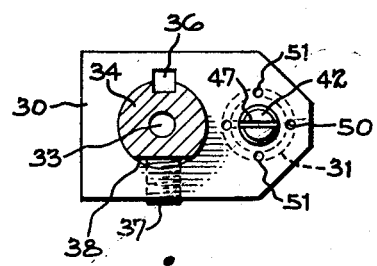
Figure 14 is a sectional view taken on line 14—14, Figure 5, further detailing the mounting block and blade shaft.

Referring to Figure 13 it will be noted that the lower lug 40 includes a bore 44 having a coarse screw thread, the knife shaft having an enlarged threaded diameter 45 at its lower portion which interfits the threaded bore of the block. In the present disclosure the threads are of ½ inch lead, double thread. This lead is found to provide a spiral path of motion suitable to shift the blade in a reliable manner to its cutting plane flush with the end of the mandrel as the blade swings through its 180° arc and from retracted to extended position. As disclosed, the threads are tapered in profile similar to a screw thread of the Acme type. The torsion spring 31 is confined upon the shaft between the upper and lower lugs and has its lower end anchored in a slot 47 formed in the shaft. For this purpose, the lower end of the spring is provided with a straight portion 48 bent to extend diametrically across the lower coil and passing through the slot. The upper end of the spring includes an end portion 50 bent upwardly and anchored in one of several holes 51 which are drilled in the upper lug about the axis of shaft 42 (Figure 14).

The spring 31 is wound in a direction to rotate the shaft and blade under predetermined torque toward its retracted position, the turning force being regulated by engagement of the end 50 of the spring in the selected hole 51. The turning force of the spring is relatively light in proportion to the force acting upon the blade to swing it to extended position; however it contributes to the retracting force when rotation of the cutoff mechanism is abruptly stopped and also safeguards the mechanism by holding the blade in retracted position against accidental outward displacement.

Referring to Figure 13, it will be observed that the knife shaft 42 includes at its lower end a square portion 52 and the blade includes a mating square hole 53 providing a non-rotatable mounting. The blade is secured upon the square shaft by a commercial lock nut 54 screwed upon the threaded shaft 55 below the square portion and clamping the blade against the shoulder 56 formed by the lower end of the enlarged threaded diameter 45.

As shown in Figure 6, the blade is provided with a right angular end extension 57 which is proportioned to allow the shank 58 of the blade to reside substantially in parallelism with the mounting block and outwardly from the axis of rotation when in retracted position. It will be noted that the shank of the blade rests against the flat 38 such that the flat provides a stop when the blade is snapped from extended to retracted position.

As best shown in Figure 5, the blade resides in a plane below the bottom of the mounting block when in retracted position with the offset spaced downwardly below the bottom lug 40 as indicated by the clearance 60. Upon sudden rotation of the mounting block, in the direction indicated in Figure 9, the blade begins to rotate outwardly with respect to the block, and by virtue of the threaded engagement of the blade shaft, the blade spirals upwardly from the plane shown in Figure 5 toward the mounting block. The lead of the threads 44 and 45 is such that the blade travels upwardly to the lower surface 61 of lug 40 during its arc of motion from the retracted position to the fully extended position shown in broken lines in Figure 9. The distance of climb therefore corresponds substantially to the clearance 60 and as indicated earlier, the blade climbs until it contacts the lower end of the mandrel as shown in Figure 4.

Figure 12:
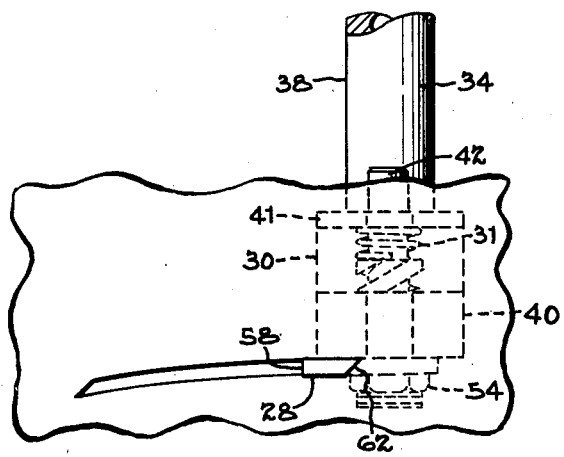
Figure 12 is a diagrammatic view, illustrating the upward path of motion of the blade with respect to the exterior of the clay pipe wall as the blade penetrates and begins to sever the wall.

Referring to Figure 9, the end of the blade begins to penetrate the clay wall when it is partially extended and after penetrating the wall, continued climbing of the blade causes it to spiral upwardly as indicated by the cutting line shown in Figure 12. It will be noted that the cutting edge 62 of the blade is chamfered upwardly in the direction of its spiral motion to provide an efficient cutting action. By virtue of the speed of blade rotation, the chamfer also compensates for any downward motion of the clay column by planing upwardly as it cuts the clay wall. After reaching the limit of its climbing motion, the blade continues to rotate for several revolutions in a fixed plane so as to completely sever the end of the clay tube flush with the end of mandrel 20 (Fig. 4).

Upon reaching its fully extended position as indicated in Figure 9, the right angular end extension 57 swings into abutment with a shoulder 63 formed in the bottom of the block at the juncture between the lower surface of lug 40 and block. When the shoulder thus locks the blade in extended position, the blade has climbed to a plane in which the surface of the right angular extension 57 is substantially in contact with the lower surface 61 of lug as indicated in Figure 10.

Figure 10:
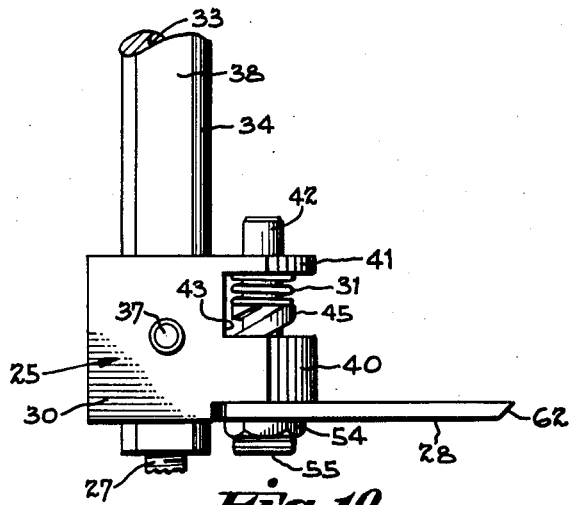
Figure 10 is a view similar to Figure 5, showing the relationship of the parts with the blade in fully extended position.
Figure 11:
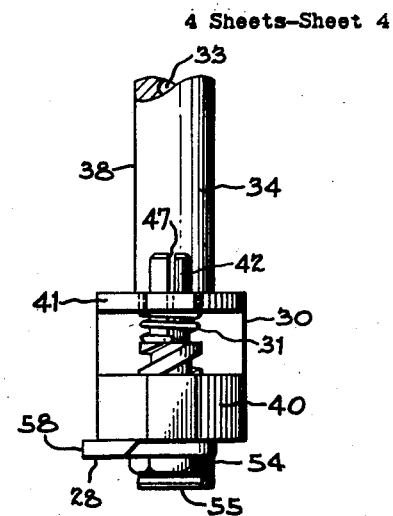
Figure 11 is a view of the structure as projected from Figure 10, further illustrating the relationship of the parts.

It will be apparent that as the blade and its shaft climbs upwardly, the torsion spring 31 is wound up and is also compressed lengthwise as shown in Figure 10. The energy thus stored in the spring biases the blade shaft downwardly and also tends to rotate the shaft in the blade retracting direction. As soon as the mechanism is braked to a stop, the blade begins to spiral downwardly away from the severed end of the pipe which remains in the die as indicated at 64 in Figure 4. The spring then becomes effective to supplement the inertia effect in swinging the blade back to its fully retracted position and, as indicated earlier, continues to urge the blade in this direction to maintain it in retracted position.

As explained earlier, the former cap continues its downward motion under momentum to trip the cutoff mechanism and sever the pipe. Under normal conditions, the extruded pipe will hang from the die in stationary position until the cutoff mechanism severs it. However, due to residual clay pressure or other causes, the clay spigot may continue extruding slowly when the knife snaps to cutting position. The upward climbing action of the blade as indicated in Figure 12 is sufficiently rapid in relation to the downwardly moving pipe wall to allow the blade to climb at least as fast as the downward pipe motion as it pierces the wall and swings to fully extended position. Upon being fully extended, the chamfer 62 of the blade provides a continued upward planing action to compensate for the downward motion, as explained earlier.

The clay has an abrasive action which causes the blade to wear very rapidly, requiring replacement every few days. By virtue of the mounting of the blade upon its shaft, the blade may be replaced in a simple manner by removing the lock nut 54 and slipping a new blade upon the squared portion of the shaft.

*Cutoff driving system*

The cutoff mechanism is rotated and stopped abruptly by the driving system which is illustrated generally in Figures 1 and 2. The rotary motion is imparted by the motor 65 operating through a clutch-brake unit 66 which is under the control of the former cap structure and cutoff switch as indicated earlier. The motor is energized continuously and the clutch is engaged when the cap reaches its downwardly movement of travel and holds the switch closed during a momentary dwell. As the cap moves upwardly, the switch opens and engages the brake to stop the rotation abruptly as the cap approaches the die.

Motor 65 is mounted upon a platform 67 attached to the frame 68 of the extrusion machine and in driving connection through the clutch-brake unit by a drive shaft 70. The clutch-brake unit comprises a clutch 71 and a brake 72 actuated by a yoke 73 which is shifted by an air cylinder 74. The air cylinder includes an electrically operated controlled valve which responds to the operation of the automatic cutoff switch as it is tripped by the former cap structure. This arrangement provides several complete revolutions of the cutoff blade during the momentary dwell of the cap.

In the structure disclosed, air pressure is applied continuously to the cylinder to draw the link 75 and yoke in a direction to apply the brake. Upon tripping of the cutoff switch, air pressure is applied to the opposite end of the cylinder, causing the link to be shifted in the opposite direction to disengage the brake and engage the clutch.

It will be noted in Figure 2 that the stationary element of the brake is locked in stationary position by an arm 76 extending from a bracket 77 which also provides a mounting plate for the air cylinder 74. Upon application of the brake, the turning force of the driving system and cutoff mechanism is transmitted by the brake to the fixed arm 76.

The extended portion of drive shaft 70 is supported by a bearing 78 and is in driving connection with a shaft 80 by means of a coupler 81. Shaft 80 passes through an arm 82 which supports the mandrel or core die 20 within the extrusion die and is journalled therein by ball bearings 83. The inner end of shaft 80 includes a bevel gear 84 meshing with a second bevel gear 85 mounted upon the upper end of the vertical drive shaft 32 to complete the drive from the motor to the cutoff head.

The air and lubricant mixture is conducted from a source of supply by a conduit 86 communicating with a bore 87 through arm 82, the bore extending to an annular groove 88 surrounding the upper end of shaft 32. The annular groove is preferably sealed off by packing rings surrounding the shaft and the shaft includes radial holes (not shown) in communication with the lubricant bore 33 which extends through the shaft to the lubricant tube as indicated in Figure 3.

Having described my invention I claim:

1. A cutoff mechanism for a clay pipe extrusion machine having an extrusion die, a core die having an end disposed within the extrusion die, and driving means arranged to be rotated and braked, said cutoff mechanism comprising, a mounting head connected to the driving means, said head having a bore disposed upon an axis parallel with the driving means and displaced laterally therefrom, said bore including an internal spiral surface, a blade mounting shaft having means rotatably interfitting the internal spiral surface of said bore, a cutoff blade having an end attached to said shaft, the blade being normally disposed in a plane spaced from the end of the core die, the blade being free to swing to extended and retracted positions relative to the mounting head in response to rotation and braking of the head, thereby imparting rotary motion to said shaft, said internal spiral surface leading in a direction to shift the blade mounting shaft axially toward the core die upon rotation of the shaft in a direction to extend the cutoff blade, whereby the shaft is effective to shift the blade toward the end of the core die upon swinging to extended position to sever the extruded pipe adjacent the end of the core die and is effective to shift the blade away from the severed end of the pipe upon swinging to retracted position.

2. A cutoff mechanism for a clay pipe extrusion machine having an extrusion die, a core die having an end disposed within the extrusion die, and driving means arranged to be rotated and braked, said cutoff mechanism comprising, a mounting head connected to the driving means, said head having a threaded bore disposed upon an axis parallel with the driving means and displaced laterally therefrom, a blade mounting shaft, said shaft having a screw threaded portion extending through said bore and rotatably interfitting the screw threads therein, a cutoff blade having an end attached to said shaft, the blade being disposed in a plane spaced from the end of the core die, the blade being free to swing to extended and retracted positions relative to the mounting head in response to rotation and braking of the head, thereby imparting rotary motion to said shaft, the screw threads of said threaded bore and blade mounting shaft leading in a direction to shift the shaft axially toward the core die upon rotation of the shaft in a direction to extend said blade, whereby the shaft is effective to shift the blade toward the end of the core die upon swinging to extended position to sever the extruded pipe adjacent the end thereof and is effective to shift the blade away from the severed end of the pipe upon swinging to retracted position.

3. A cutoff mechanism for a clay pipe extrusion machine having an extrusion die, a core die having an end disposed within the extrusion die, and driving means arranged to be rotated and braked, said cutoff mechanism comprising, a mounting head disposed in the extrusion die and connected to the driving means, said head having a bore disposed upon an axis parallel with the driving means and displaced laterally therefrom, a blade mounting shaft rotatably journalled in said bore, respective interfitted spiral bearing surfaces disposed relative to the bore and shaft effective to shift the shaft axially relative to the head upon rotation of the shaft, a cutoff blade having an end attached to said shaft, the blade being normally disposed in a plane spaced outwardly from the mounting head and from the end of the core die, the blade being free to swing to extended and retracted positions relative to the mounting head in response to rotation and braking of the head by the driving means and thereby imparting rotary motion to said shaft, the spiral bearing surfaces leading in a direction to shift the blade mounting shaft axially toward the core die upon rotation of the shaft in a direction to extend the blade, whereby the shaft is effective to shift the blade toward the end of the core die upon swinging to extended position to sever the extruded pipe in a plane adjacent the end thereof and is effective to shift the blade away from the severed end of the pipe upon swinging to retracted position, the blade having a cutting edge inclined in the direction of the end of the core die and acting upon the clay pipe wall during rotation of the blade to plane the same toward the end of the core die.

4. A cutoff mechanism for a clay pipe extrusion machine having an extrusion die, a core die having an end disposed within the extrusion die, and driving means arranged to be rotated and braked, said cutoff mechanism comprising, a mounting head disposed in the extrusion die and connected to the driving means, said head having a threaded bore disposed upon an axis parallel with the driving means and displaced laterally therefrom, a blade mounting shaft, said shaft having a screw threaded portion rotatably journalled in said bore and interfitting the screw threads therein, a cutoff blade having an end attached to said shaft, the blade normally being disposed in a plane spaced outwardly from the mounting head and from the end of the core die, the blade being free to swing to extended and retracted positions relative to the mounting head in response to rotation and braking of the head by the driving means and thereby imparting rotary motion to said shaft, the screw threads of the shaft and bore leading in a direction to shift the blade mounting shaft axially toward the core die upon rotation of the shaft in a direction to extend said blade, whereby the shaft is effective to shift the blade toward the end of the core die upon swinging to extended position to sever the extruded pipe adjacent the end thereof and is effective to shift the blade away from the severed end of the pipe upon swinging to retracted position, and spring means connected to the mounting head and shaft, said spring means urging said shaft axially in blade retracting direction.

5. A cutoff mechanism for a clay pipe extrusion machine having an extrusion die, a core die having an end disposed within the extrusion die, and driving means arranged to be rotated and braked, said cutoff mechanism comprising, a mounting head disposed in the extrusion die and connected to the driving means, said head having a threaded bore disposed upon an axis parallel with the driving means and displaced laterally therefrom, a blade mounting shaft, said shaft having a screw threaded portion rotatably journalled in said bore and interfitting the screw threads therein, a cutoff blade having an end attached to said shaft, the blade normally being disposed in a plane spaced outwardly from the mounting head and from the end of the core die, the blade being free to swing to extended and retracted positions relative to the mounting head in response to rotation and braking of the head by the driving means and thereby imparting rotary motion to said shaft, the screws threads of the shaft and bore leading in a direction to shift the blade mounting shaft axially toward the core die upon rotation of the shaft in a direction to extend said blade, whereby the shaft is effective to shift the blade toward the end of the core die upon swinging to extended position to sever the extruded pipe adjacent the end thereof and is effective to shift the blade away from the severed end of the pipe upon swinging to retracted position, and torsion spring means encircling said shaft and having its opposite ends anchored to said shaft and mounting head, said spring means being preloaded to apply rotary force to said shaft in blade retracting direction.

6. A cutoff mechanism for a clay pipe extrusion machine having an extrusion die, a core die having an end disposed within the extrusion die, and driving means arranged to be rotated and braked, said cutoff mechanism comprising, a mounting head disposed in the extrusion die and connected to the driving means, said head having a lug on one side of the head including a bore disposed upon an axis parallel with the driving means and displaced laterally therefrom, a blade mounting shaft rotatably journalled in said bore, respective interfitted spiral bearing surfaces disposed relative to the bore and shaft effective to shift the shaft axially relative to the head upon rotation of the shaft, a cutoff blade having an end attached to said shaft, the blade normally being disposed in a plane spaced outwardly from the mounting head and from the end of the core die, the blade being free to swing to extended and retracted positions relative to the mounting head in response to rotation and braking of the head by the driving means and thereby imparting rotary motion to said shaft, the spiral bearing surfaces leading in a direction to shift the blade mounting shaft axially toward the core die upon rotation of the shaft in a direction to extend said blade, whereby the shaft is effective to shift the blade toward the end of the core die upon swinging to extended position to sever the extruded pipe adjacent the end thereof and is effective to shift the blade away from the severed end of the pipe upon swinging to retracted position, a second lug on the mounting shaft having a bore in axial alignment with the first mentioned bore, the shaft having a portion rotatably engaged in said second bore, and a spring encircling said shaft portion and having an end seated against said second lug, the spring having an opposite end seated against the shaft, the spring being under compression and urging the shaft axially in blade retracting direction.

References Cited in the file of this patent
UNITED STATES PATENTS

| 272,727 | Lyle | Feb. 20, 1883 |
|---|---|---|
| 1,651,205 | Hibbins | Nov. 29, 1927 |
| 2,497,724 | Gilson et al. | Feb. 14, 1950 |